(12) United States Patent
Sugihara et al.

(10) Patent No.: US 9,379,593 B2
(45) Date of Patent: Jun. 28, 2016

(54) VEHICLE DRIVE DEVICE

(71) Applicant: Panasonic Corporation, Osaka (JP)

(72) Inventors: Kenji Sugihara, Tokyo (JP); Satoru Itani, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 225 days.

(21) Appl. No.: 14/349,527

(22) PCT Filed: Oct. 11, 2012

(86) PCT No.: PCT/JP2012/006521
§ 371 (c)(1),
(2) Date: Apr. 3, 2014

(87) PCT Pub. No.: WO2013/054522
PCT Pub. Date: Apr. 18, 2013

(65) Prior Publication Data
US 2014/0265655 A1 Sep. 18, 2014

(30) Foreign Application Priority Data

Oct. 13, 2011 (JP) .................................. 2011-225863

(51) Int. Cl.
*H02K 9/00* (2006.01)
*H02K 7/14* (2006.01)
(Continued)

(52) U.S. Cl.
CPC ................ *H02K 9/00* (2013.01); *B60K 7/0007* (2013.01); *H02K 3/22* (2013.01); *H02K 5/20* (2013.01); *H02K 7/14* (2013.01); *H02K 9/19* (2013.01); *B60K 11/02* (2013.01); *B60K 11/04* (2013.01); *B60K 2001/006* (2013.01); *B60K 2007/0038* (2013.01); *B60K 2007/0092* (2013.01); *B60L 2220/44* (2013.01); *B60L 2220/46* (2013.01); *Y02T 10/641* (2013.01)

(58) Field of Classification Search
CPC .............. H02K 9/19; H02K 5/20; H02K 9/00
USPC ......................................... 310/52, 54, 58, 64
See application file for complete search history.

(56) References Cited

U.S. PATENT DOCUMENTS 4,229,671 A * 10/1980 Lesokhin ................. H02K 3/22
310/198
4,254,352 A * 3/1981 Fidei ...................... H02K 3/505
310/260

(Continued)

FOREIGN PATENT DOCUMENTS

| CN | 101017995 A | 8/2007 |
|---|---|---|
| EP | 1168571 A2 | 1/2002 |

(Continued)

OTHER PUBLICATIONS

International Search Report for Application No. PCT/JP2012/006521 dated Dec. 25, 2012.

*Primary Examiner* — Hanh Nguyen
(74) *Attorney, Agent, or Firm* — Pearne & Gordon LLP (57) ABSTRACT

A vehicle drive device that has a stator and a rotor disposed on the inside of the vehicle wheel and drives the wheel, wherein the whole stator can be intensively cooled without causing an increase in production costs. The vehicle drive device comprises: the stator that has a stator core (20) and a hollow stator coil (30), is arranged on the inside of the rotating vehicle wheel (10), and electrically generates magnetic force; the rotor that has permanent magnets (11) connected to the wheel (10), and applies rotational force to the wheel (10) using the magnetic force of the stator; a cooling medium that flows through the hollow section of the stator coil (20); and a first radiator unit (50) that releases heat from the cooling medium.

7 Claims, 6 Drawing Sheets

(51) Int. Cl.
*H02K 9/19* (2006.01)
*B60K 7/00* (2006.01)
*H02K 3/22* (2006.01)
*H02K 5/20* (2006.01)
*B60K 11/04* (2006.01)
*B60K 11/02* (2006.01)
*B60K 1/00* (2006.01)

(56) References Cited

U.S. PATENT DOCUMENTS

| | | | | |
|---|---|---|---|---|
| 5,055,729 A | * | 10/1991 | Fogarty | H02K 3/24 310/214 |
| 5,325,007 A | * | 6/1994 | Huss | H02K 1/12 310/114 |
| 2004/0012294 A1 | * | 1/2004 | Rippel | H02K 1/20 310/60 A |
| 2007/0199339 A1 | | 8/2007 | Ishihara et al. | |
| 2009/0195090 A1 | * | 8/2009 | Rittenhouse | H02K 1/2786 310/44 |
| 2011/0057591 A1 | | 3/2011 | Tagome et al. | |

FOREIGN PATENT DOCUMENTS

| | | |
|---|---|---|
| JP | 10-022068 A | 1/1998 |
| JP | 2002-010554 A | 1/2002 |
| JP | 2005-086894 A | 3/2005 |
| JP | 2007-215311 A | 8/2007 |
| WO | 2009/144957 A1 | 12/2009 |

* cited by examiner

VEHICLE DRIVE DEVICE

TECHNICAL FIELD

The present invention relates to a vehicle driving apparatus for driving an automobile wheel.

BACKGROUND ART

Conventionally, some proposals have been made about an in-wheel motor provided with an electric motor in an automobile wheel, and a cooling structure for such an in-wheel motor. For example, Patent Literature (hereinafter, referred to as PTL) 1 proposes a configuration in which oil is put in a casing surrounding a stator coil of an in-wheel motor to cool the stator coil.

As a technique relevant to the invention of the present application, PTL 2 discloses a configuration for cooling an electromagnetic coil by causing fluid to flow through a hollow portion of the electromagnetism coil.

CITATION LIST

Patent Literature

PTL 1
Japanese Patent Application Laid-Open No. 2005-086894
PTL 2
Japanese Patent Application Laid-Open No. HEI 10-022068

SUMMARY OF INVENTION

Technical Problem

When the configuration for immersing the stator coil in oil to cool the stator coil is employed in order to cool the in-wheel motor, the circumference of the stator coil needs to be covered with a sealed casing. When the configuration for covering a portion including a rotational element with the sealed casing is employed, the casing is required to have high rigidity and machining accuracy, which causes a problem of an increase in the manufacturing cost of the in-wheel motor.

The technique for cooling the electromagnetic coil disclosed in PTL 2 focuses on cooling of only the electromagnetic coil and differs from a configuration involving the necessity of cooling both a stator coil and a stator core like an in-wheel motor. In an in-wheel motor, a stator core generates a large amount of heat because of a strong oscillating magnetic field, and therefore a stator coil needs to be cooled significantly.

It is an object of the present invention to enable a whole stator to be cooled a significantly without increasing the manufacturing cost in a vehicle driving apparatus which is provided with a stator and a rotor inside an automobile wheel to drive the wheel.

Solution to Problem

A vehicle driving apparatus according to an aspect of the present invention includes: a stator that includes a stator core and a hollow stator coil, that is placed inside an automobile wheel, and that electrically generates a magnetic force; a rotor that includes a permanent magnet connected to the wheel and that applies a rotational force to the wheel by the magnetic force of the stator; a cooling medium that flows through a hollow portion of the stator coil; and a first radiator section that radiates heat of the cooling medium.

A vehicle driving apparatus according to an aspect of the present invention employs a configuration in which a side of the stator coil that is in contact with the stator core has a linear shape in a lateral cross section of wiring of the stator coil.

Advantageous Effects of Invention

According to the present invention, the stator can be cooled significantly without increasing the manufacturing cost.

DESCRIPTION OF EMBODIMENTS

Hereinafter, embodiments according to the present invention will be described in detail with reference to the accompanying drawings.

(Embodiment 1)

Figure 1:
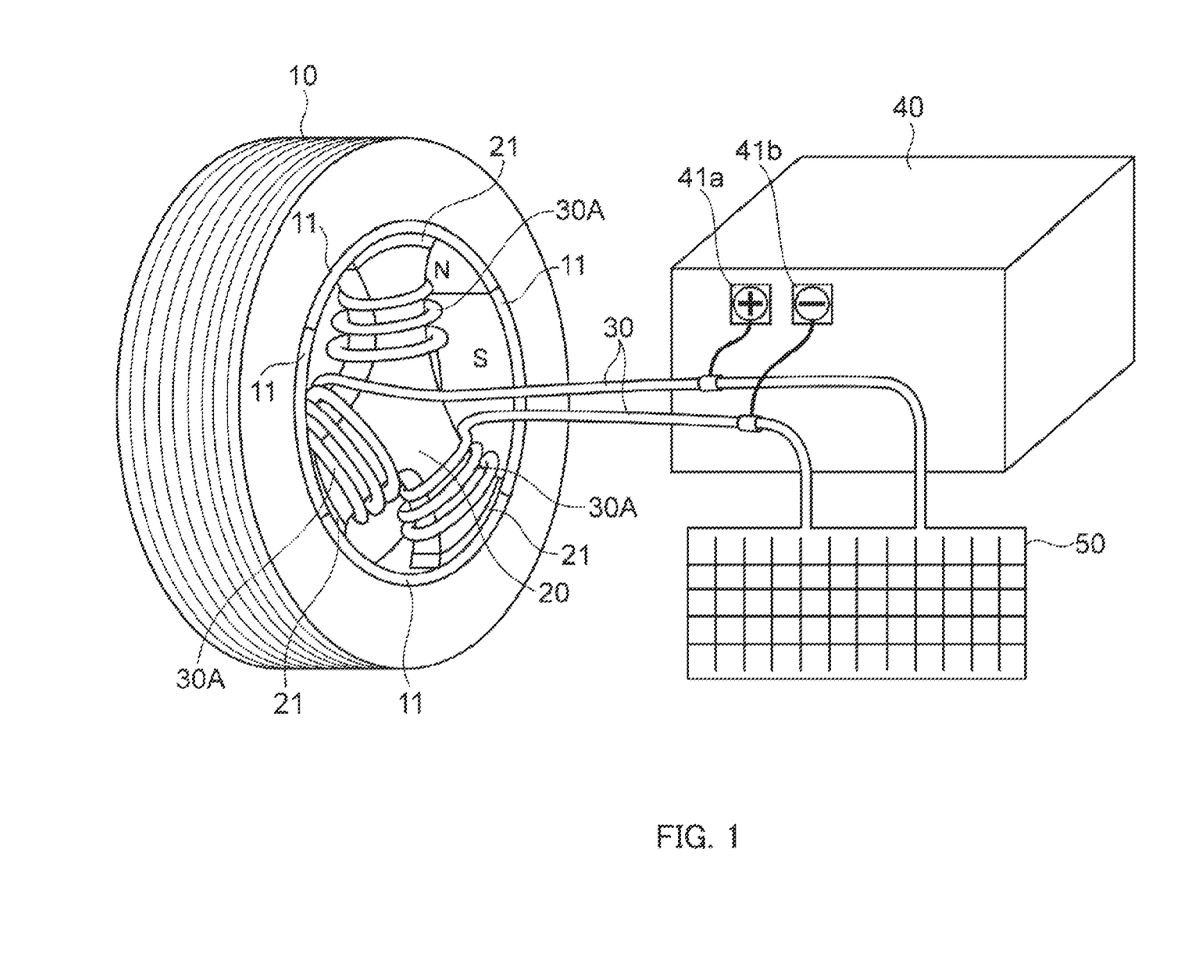
FIG. 1 is a configuration diagram illustrating a vehicle driving apparatus according to Embodiment 1 of the present invention.
Figure 2:
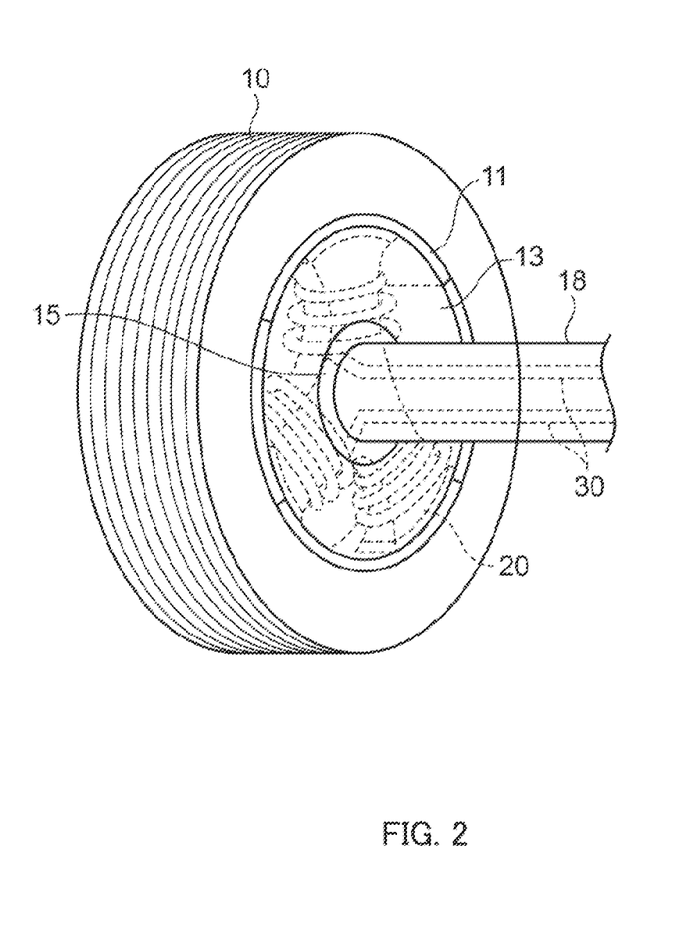
FIG. 2 is a perspective view illustrating the supporting structure of a wheel and a stator of the vehicle driving apparatus according to Embodiment 1 of the present invention.

FIG. 1 is a configuration diagram illustrating a vehicle driving apparatus according to Embodiment 1 of the present invention, and FIG. 2 is a perspective view illustrating the supporting structure of a wheel and a stator of the vehicle driving apparatus.

As illustrated in FIG. 1, the vehicle driving apparatus according to Embodiment 1 mainly includes wheel 10, permanent magnet 11, stator core 20, stator coil 30A, pipe member 30 continuously connected to stator coil 30A, motor driving apparatus 40, and radiator 50.

In these elements, permanent magnet 11, stator core 20, and stator coil 30A constitute an electromagnetic motor (referred to as in-wheel motor). Wheel 10 and permanent magnet 11 constitute the rotor of the electromagnetic motor, and stator core 20 and stator coil 30A constitute the stator of the electromagnetic motor.

Wheel 10 is, for example, a wheel of an electric vehicle, and a tire is attached to the outer periphery of the wheel while a space for placing stator core 20 is provided on the inner circumference side. As illustrated in FIG. 2, wheel 10 is rotatably supported by axle 18 via frame 13 and ring bearing 15. Axle 18 is unrotatably fixed to the vehicle body.

Permanent magnet 11 is fixed to the inner peripheral surface of wheel 10 and is placed so that an S pole and an N pole appear at each predetermined angle.

Stator core 20 is formed of a magnetic substance. Stator core 20 has a plurality of magnetic pole portions 21 each having an end surface that faces permanent magnet 11 and that emits a magnetic flux. Stator core 20 has a body portion around which stator coil 30A is wound. Stator coil 30A is tightly wound around stator core 20, which in turn, ensures high thermal conductivity between stator core 20 and stator coil 30A. As illustrated in FIG. 2, stator core 20 is unrotatably held by unrotatable axle 18 with a small gap provided between the end surface of magnetic pole portion 21 and permanent magnet 11.

Figure 3:
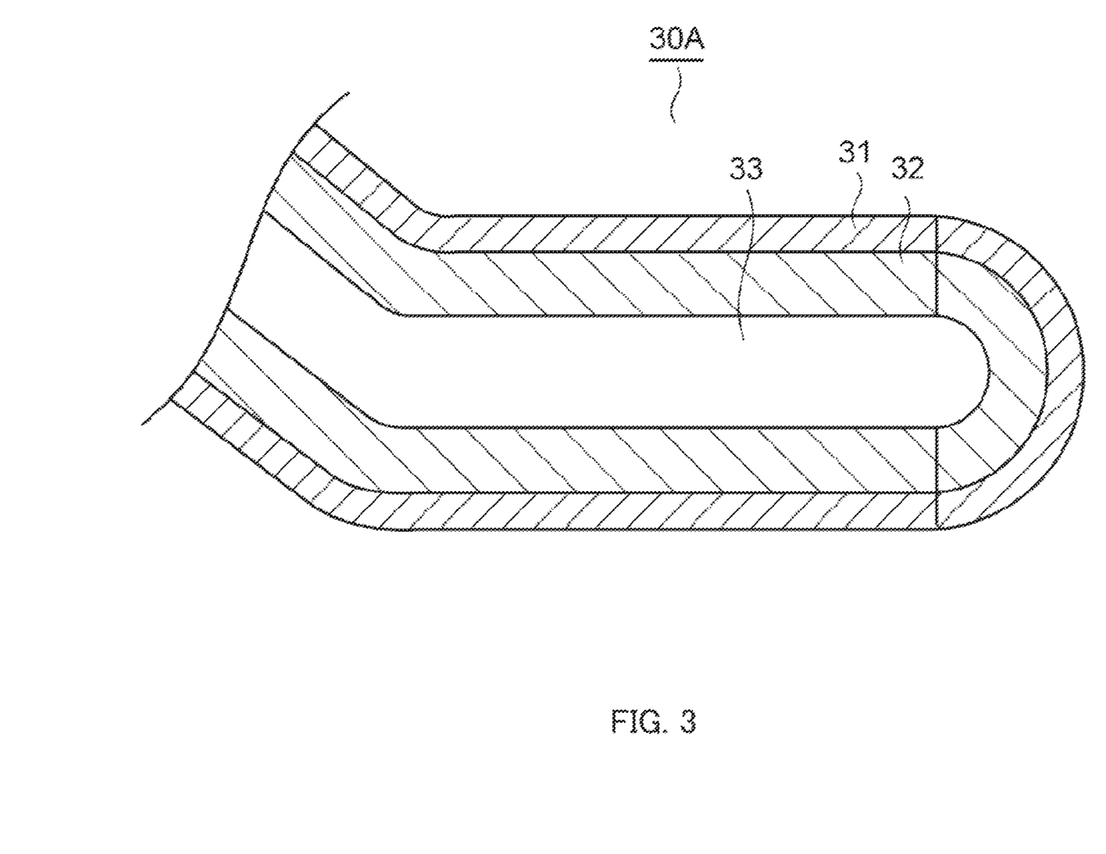
FIG. 3 is a partially cutaway perspective view illustrating the structure of a stator coil of the vehicle driving apparatus according to Embodiment 1 of the present invention.

FIG. 3 is a partially cutaway perspective view illustrating the structure of stator coil 30A. FIG. 3 represents a state where the wiring of stator coil 30A is cut in the longitudinal direction and a direction orthogonal to the longitudinal direction.

Stator coil 30A is a coil generating a magnetic field in stator core 20 due to a current flowing through stator coil 30A. As illustrated in FIG. 3, the wiring of stator coil 30A is a tubular shape having hollow portion 33 in its inside, and a cooling medium flows through hollow portion 33 to cool the stator. The cooling medium is, for example, cooling oil.

The wiring of stator coil 30A is larger in thickness than wiring of a simple lead wire and cannot therefore be wound around stator core 20 many times. However, a large current flowing through stator coil 30A can generate a necessary quantity of magnetic flux in the stator.

As illustrated in FIG. 3, the wiring of stator coil 30A mainly includes insulation coating 31 formed of a material such as resin covering the outer periphery, metallic pipe 32 for carrying electricity, and hollow portion 33 which is the hollow portion of metallic pipe 32. Metallic conduit 32 is formed of a material having high heat conductivity, such as copper. Insulation coating 31 is an insulator formed of a material having high heat conductivity.

Pipe member 30 has the same configuration as the wiring of stator coil 30A. Pipe member 30 functions as wiring for electrically connecting motor driving apparatus 40 to stator coil 30A and as piping for connecting stator coil 30A to radiator 50 to feed a cooling medium. As illustrated in FIG. 2, pipe member 30 passes up to the inside of wheel 10 through via hollow portion of axle 18.

Motor driving apparatus 40 causes a current to flow through stator coil 30A on the basis of a driving operation and drives the rotation of wheel 10. Electrodes 41a and 41b of motor driving apparatus 40 are electrically connected to metallic pipe 32 of pipe member 30 by lead wires. These lead wires penetrate insulation coating 31 of pipe member 30 and are connected to internal metallic pipe 32.

In FIG. 1, two lines are connected from motor driving apparatus 40 to stator coil 30A. However, in using the electromagnetic motor as a multiphase motor, a plurality of stator coils 30A may be wound around stator core 20, and three or more lines may be connected from motor driving apparatus 40 to three or more pipe members 30 connected to stator coils 30A. Stator core 20 may be configured to have three or more magnetic pole portions 21. Motor driving apparatus 40 can then control currents flowing through the plurality of stator coils 30A to thereby drive the multiphase motor.

Radiator 50 performs heat exchange between the ambient air and the cooling medium flowing through stator coil 30A and radiates heat of the cooling medium. Radiator 50 and pipe member 30 are connected to each other with electric insulation so that no current flows between the two. Radiator 50 is provided with a pump to circulate the cooling medium between stator coil 30A and radiator 50. Alternatively, the pump may be provided in the exterior of radiator 50.

In the vehicle driving apparatus according to Embodiment 1, motor driving apparatus 40 causes a current to flow through stator coil 30A according to a driving operation. This current generates a magnetic flux in stator coil 30A and stator core 20, and exerts electromagnetic force on permanent magnet 11 and wheel 10. Wheel 10 then rotates because of this electromagnetic force. Wheel 10 rotates while being supported via bearing 15 by unrotatable axle 18.

In the vehicle driving apparatus according to Embodiment 1, the cooling medium cooled in radiator 50 flows inside stator coil 30A through pipe member 30. Therefore, although stator core 20 and stator coil 30A generate heat accompanied with driving of the motor, stator coil 30A is directly cooled by the cooling medium. Furthermore, since stator coil 30A contacts stator core 20 with high heat conductivity, stator core 20 is significantly cooled by stator coil 30A.

(Embodiment 2)

Figure 4:
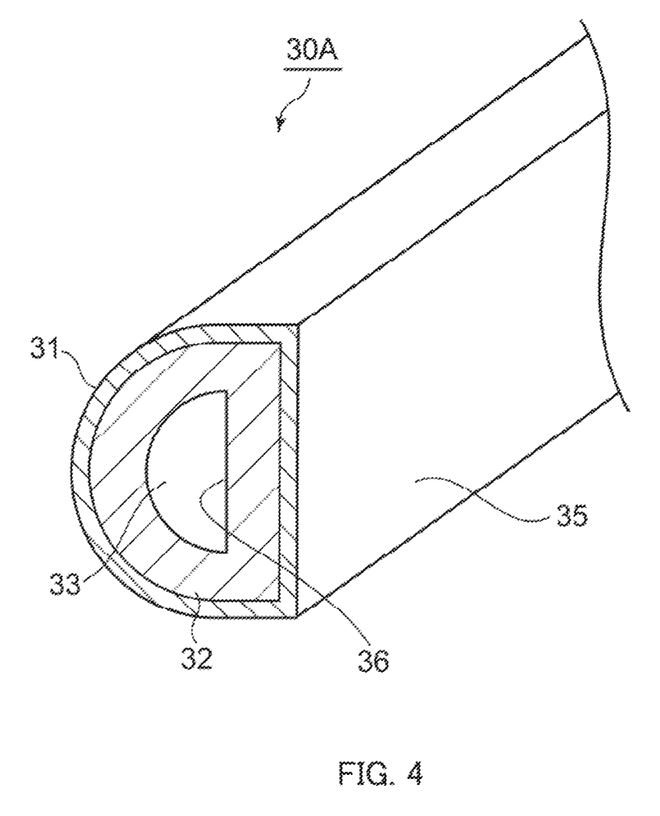
FIG. 4 is a partially cutaway perspective view illustrating the structure of a stator coil of a vehicle driving apparatus according to Embodiment 2 of the present invention.

FIG. 4 is a partially cutaway perspective view illustrating the structure of a stator coil of the vehicle driving apparatus according to Embodiment 2 of the present invention.

In the vehicle driving apparatus according to Embodiment 2, pipe member 30 included in stator coil 30A has one surface 35 having a flat shape. Flat surface 35 is wound around stator core 20 so as to be in contact with stator core 20. In other words, the side in contact with stator core 20 (surface 35) has a linear shape in a lateral cross section of pipe member 30 (cross section orthogonal to the longitudinal direction).

This configuration can increase the contact density between stator core 20 and stator coil 30A, thus enabling higher thermal conductivity between stator core 20 and stator coil 30A.

Furthermore, in pipe member 30 included in stator coil 30A according to Embodiment 2, inner peripheral surface 36 on the side of stator core 20 of hollow portion 33 is formed in a flat shape. In other words, hollow portion 33 in a lateral cross section of pipe member 30 on the side of stator core 20 is formed in a linear shape and has a larger width on the side of stator coil 30A than on the opposite side of stator coil 30A.

This configuration can cause the cooling medium flowing through hollow portion 33 to have a higher flow rate on the side near stator core 20 and can cool stator core 20 more intensively.

Therefore, the vehicle driving apparatus according to Embodiment 2 can cool stator core 20 more significantly and can cool the whole stator more equally.

(Embodiment 3)

Figure 5:
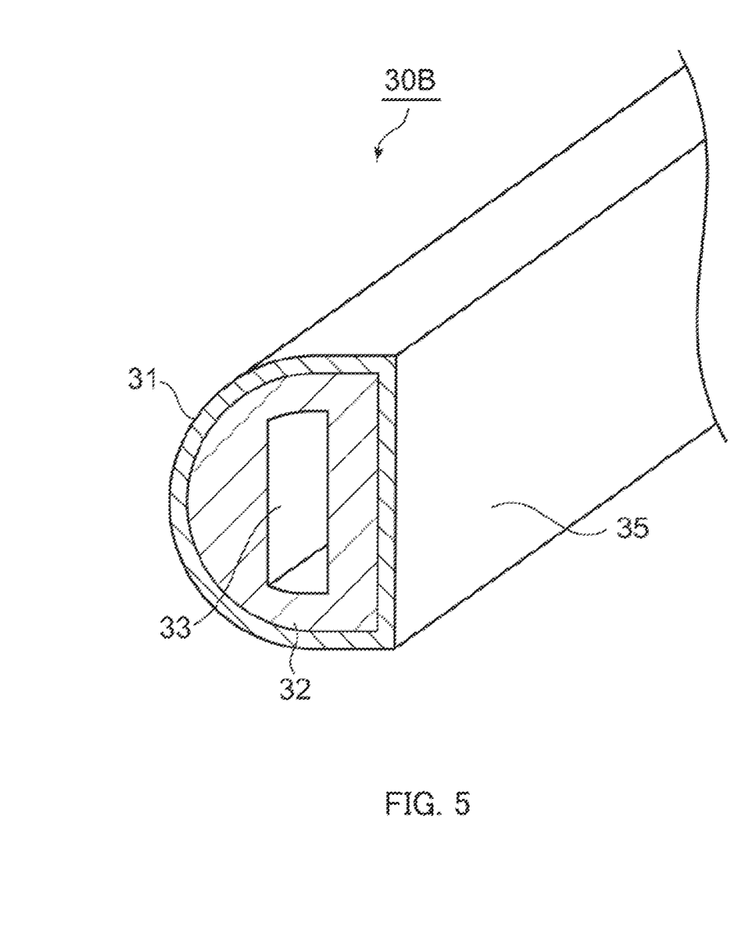
FIG. 5 is a partially cutaway perspective view illustrating the structure of a stator coil of a vehicle driving apparatus according to Embodiment 3 of the present invention.

FIG. 5 is a partially cutaway perspective view illustrating the structure of a stator coil of a vehicle driving apparatus according to Embodiment 3 of the present invention.

In the vehicle driving apparatus according to Embodiment 3, pipe member 30 included in stator coil 30B has one surface 35 having a flat shape similarly to Embodiment 2. Furthermore, in Embodiment 3, hollow portion 33 of pipe member 30 included in stator coil 30B is formed in a rectangular shape in a cross section and is placed eccentrically toward stator core 20.

This configuration can cause the cooling medium flowing through hollow portion 33 to absorb more heat on the side near stator core 20 and can therefore cool stator core 20 more intensively.

Therefore, the vehicle driving apparatus according to Embodiment 3 can cool stator core 20 more significantly and can cool the whole stator more equally.

(Embodiment 4)

Figure 6:
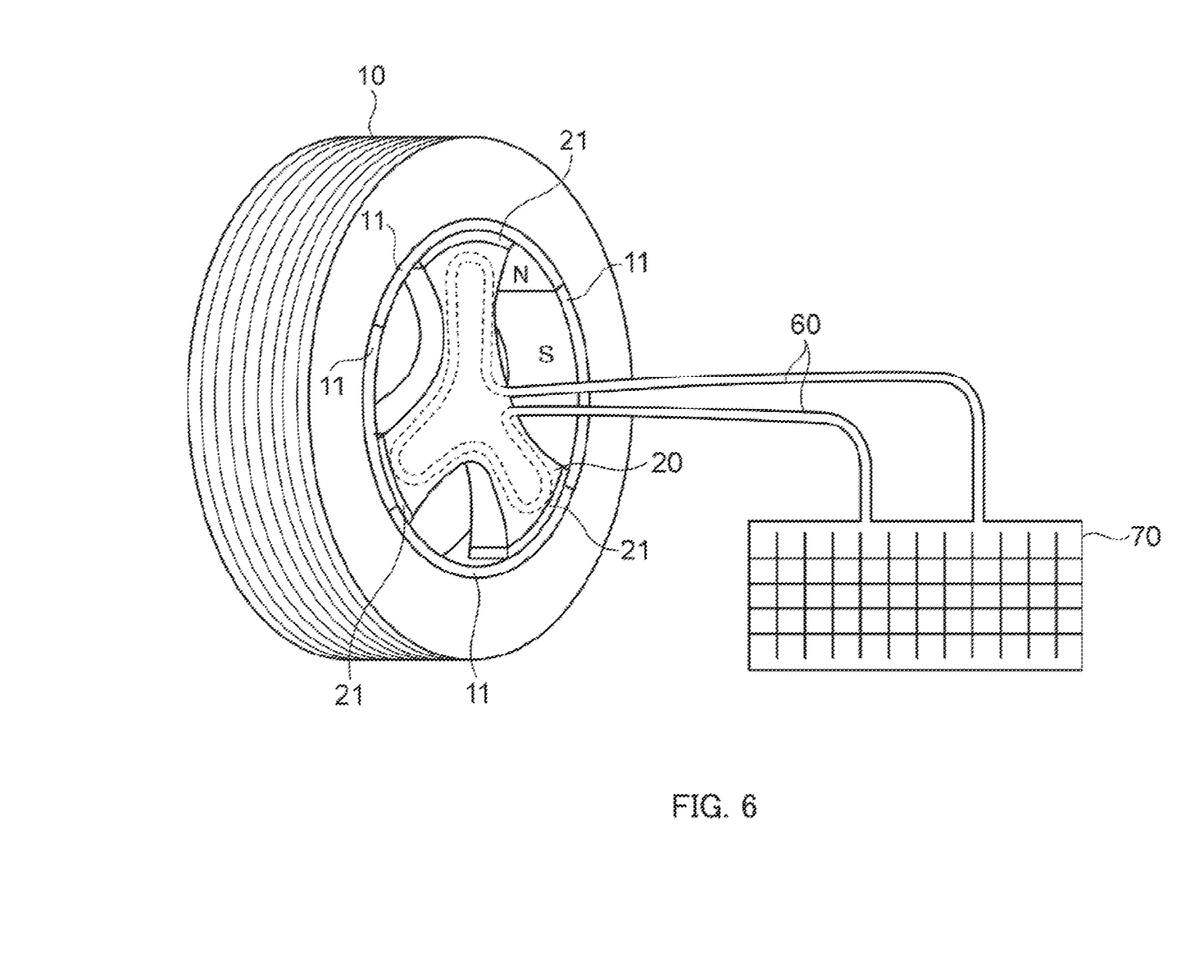
FIG. 6 is a configuration diagram illustrating an additional configuration in a vehicle driving apparatus according to Embodiment 4 of the present invention.

FIG. 6 is a configuration diagram illustrating an additional configuration in a vehicle driving apparatus according to Embodiment 4 of the present invention. In FIG. 6, pipe member 30, stator coil 30A, motor driving apparatus 40, and radiator 50 in FIG. 1 are omitted to mainly illustrate the additional configuration of Embodiment 4.

The vehicle driving apparatus according to Embodiment 4 includes pipe member 30, stator coil 30A, motor driving apparatus 40, and radiator (the first radiator) 50 similarly to Embodiment 1. Furthermore, the vehicle driving apparatus according to Embodiment 4 includes pipe member 60 and second radiator 70 as illustrated in FIG. 6.

Pipe member 60 allows a cooling medium (for example, cooling oil) to flow through its inside and is partially embedded in the inside of stator core 20. Pipe member 60 contacts stator core 20 with high thermal conductivity. Alternatively, pipe member 60 may be connected to a through-hole provided in a path having many ranges inside stator core 20.

Second radiator 70 performs heat exchange between the cooling media flowing through pipe member 60 and the ambient air and radiates heat of the cooling medium. Second radiator 70 is provided with a pump to circulate the cooling medium between pipe member 60 and second radiator 70. Alternatively, the pump may be provided in the exterior of second radiator 70.

According to the vehicle driving apparatus of Embodiment 4, in addition to cooling of stator core 20 by stator coil 30A, direct cooling of stator core 20 by pipe member 60 can be performed to suppress generation of heat of stator core 20 more. Accordingly, the whole stator is cooled more equally.

Each embodiment of the present invention has been described thus far.

In the description of each embodiment, the wiring of stator coil 30A has the same configuration as pipe member 30 extending to the exterior of the stator. However, the structures of the two elements may be different so that the portion of stator coil 30A has high thermal conductivity while the portion of pipe member 30 extending to the exterior of the stator has low thermal conductivity.

The material of insulation coating 31 of stator coil 30A and/or the material of metallic pipe 32 may be different between a side in contact with stator core 20 and the opposite side of stator core 20. More specifically, the material on the side in contact with stator core 20 may have high thermal conductivity, and the material on the opposite side of stator core 20 may have low thermal conductivity.

In each embodiment, the tubular axle is employed, and pipe member 30 passes through the inside of the tubular axle and is introduced into stator core 20. However, it is possible to employ a configuration in which the axle is provided with a through-hole, and this through-hole and stator coil 20 are connected together and thus introduce the cooling medium. In this case, a lead wire can be provided in the axle, and the motor driving apparatus can cause a current to flow in stator coil 20 through this lead wire.

The disclosure of Japanese Patent Application No. 2011-225863, filed on Oct. 13, 2011, including the specification, drawings and abstract, is incorporated herein by reference in its entirety.

INDUSTRIAL APPLICABILITY

The present invention can be applied to a driving apparatus of an electric vehicle, for example.

REFERENCE SIGNS LIST

10 Wheel
11 Permanent magnet
20 Stator core
21 Magnetic pole portion
30 Pipe member
30A Stator coil
31 Insulation coating
32 Metallic pipe
33 Hollow portion
40 Motor driving apparatus
50 First radiator
60 Pipe member
70 Second radiator

The invention claimed is:

1. A vehicle driving apparatus comprising:
   a stator that includes a stator core and a stator coil is placed inside an automobile wheel, and that electrically generates a magnetic force;
   a rotor that has a permanent magnet connected to the wheel and that applies a rotational force to the wheel by the magnetic force of the stator;
   a cooling medium that flows through a hollow portion included in wiring of the stator coil; and
   a first radiator section that radiates heat of the cooling medium, wherein
   the first radiator section and the stator coil are connected to each other and electrically isolated from each other.

2. The vehicle driving apparatus according to claim 1, wherein a side of the stator coil that is in contact with the stator core has a linear shape in a cross section of wiring of the stator coil.

3. The vehicle driving apparatus according to claim 2, wherein a side of the hollow portion on the side of the stator coil on the stator core in the cross section of the wiring of the stator coil has a linear shape along a contact surface of the stator core.

4. The vehicle driving apparatus according to claim 1, wherein the hollow portion of the stator coil is formed in a rectangular shape in a cross section of the hollow portion.

5. The vehicle driving apparatus according to claim 1, wherein the hollow portion of the stator coil is formed to have a larger width on the side of the stator core than on an opposite side of the side of the stator core.

6. The vehicle driving apparatus according to claim 1, further comprising:
   a cooling pipe which passes through an inside of the stator core and through which a cooling medium flows; and
   a second radiator section that radiates heat of the cooling medium flowing through the cooling pipe.

7. The vehicle driving apparatus according to claim 1, further comprising:
   a tubular axle that rotatably supports the wheel and unrotatably supports the stator core, wherein:
   the permanent magnet is fixed to an inner peripheral surface of the wheel;
   the stator core is placed so as to be closer to a center of the wheel than the permanent magnet; and
   wiring of the stator coil passes through the hollow portion of the axle and is wound around the stator core.

* * * * *